United States Patent
Park

(10) Patent No.: US 8,010,039 B2
(45) Date of Patent: *Aug. 30, 2011

(54) SELECTIVE SERVICE METHOD IN MULTICAST SYSTEM

(75) Inventor: Jin-Young Park, Gunpo (KR)

(73) Assignee: LG Electronics Inc., Seoul (KR)

( * ) Notice: Subject to any disclaimer, the term of this patent is extended or adjusted under 35 U.S.C. 154(b) by 146 days.

This patent is subject to a terminal disclaimer.

(21) Appl. No.: 12/337,372

(22) Filed: Dec. 17, 2008

(65) Prior Publication Data

US 2009/0097430 A1 Apr. 16, 2009

Related U.S. Application Data

(63) Continuation of application No. 11/927,015, filed on Oct. 29, 2007, now Pat. No. 7,623,887, which is a continuation of application No. 10/439,318, filed on May 16, 2003, now Pat. No. 7,308,278.

(30) Foreign Application Priority Data

May 18, 2002 (KR) .................................. 2002-27639

(51) Int. Cl.
H04H 1/00 (2006.01)
(52) U.S. Cl. ...................... 455/3.01; 370/392; 370/393
(58) Field of Classification Search ................. 455/3.01
See application file for complete search history.

(56) References Cited

U.S. PATENT DOCUMENTS

| 5,457,808 | A | 10/1995 | Osawa et al. |
| 5,459,725 | A | 10/1995 | Bodner et al. |
| 6,097,949 | A | 8/2000 | Jung et al. |
| 6,104,709 | A | 8/2000 | Rinchiuso et al. |
| 6,252,868 | B1 | 6/2001 | Diachina et al. |
| 6,252,874 | B1 | 6/2001 | Lee |
| 6,614,810 | B1 | 9/2003 | Lee et al. |
| 6,684,081 | B2 | 1/2004 | Sarkkinen et al. |
| 6,701,155 | B2 | 3/2004 | Sarkkinen et al. |
| 6,751,227 | B1 | 6/2004 | Ahmavaara et al. |
| 6,804,528 | B1 | 10/2004 | Laroia et al. |
| 6,839,348 | B2 | 1/2005 | Tang et al. |
| 6,839,565 | B2 | 1/2005 | Sarkkinen et al. |

(Continued)

FOREIGN PATENT DOCUMENTS

DE 10107700 8/2002

(Continued)

OTHER PUBLICATIONS

Bamboo MediaCasting, "Multiple Areas for an MBMS", S2-021022, 3GPP TSG-SA WG2 #24, Apr. 2002.

(Continued)

*Primary Examiner* — Creighton Smith
(74) *Attorney, Agent, or Firm* — McKenna Long & Aldridge LLP

(57) ABSTRACT

A multicast service of a 3GPP Universal Mobile Telecommunications System (UMTS) is disclosed. A multicast service stream identifier is provided so that each multicast area can receive different information for one service or one multicast service can be provided with different QoSs to areas. In addition, the multicast service stream identifier is provided which can selectively receive diverse menus or channels for one multicast service provided in the same area. Thus, by providing the multicast service stream identifier, users' desires for various services can be satisfied.

8 Claims, 6 Drawing Sheets

U.S. PATENT DOCUMENTS

| | | | |
|---|---|---|---|
| 6,965,579 B1 | 11/2005 | Shin | |
| 6,965,580 B1 | 11/2005 | Takagi et al. | |
| 7,215,948 B2 | 5/2007 | Tsukagoshi | |
| 7,308,278 B2 | 12/2007 | Park | |
| 7,415,046 B2 | 8/2008 | Beckmann et al. | |
| 7,433,334 B2 | 10/2008 | Marjelund et al. | |
| 2001/0002757 A1 | 6/2001 | Honda et al. | |
| 2002/0080737 A1 | 6/2002 | Koo et al. | |
| 2002/0124069 A1 | 9/2002 | Hatalkar | |
| 2003/0016698 A1 | 1/2003 | Chang et al. | |
| 2003/0157949 A1* | 8/2003 | Sarkkinen et al. | 455/503 |
| 2003/0194992 A1 | 10/2003 | Kim et al. | |
| 2003/0207696 A1 | 11/2003 | Willenegger et al. | |
| 2003/0211855 A1 | 11/2003 | Sarkkinen et al. | |
| 2004/0017809 A1 | 1/2004 | Park | |
| 2004/0022218 A1 | 2/2004 | Kim et al. | |
| 2004/0057387 A1 | 3/2004 | Yi et al. | |
| 2004/0081192 A1 | 4/2004 | Koulakiotis et al. | |
| 2004/0152473 A1 | 8/2004 | Kuwano et al. | |
| 2004/0184471 A1 | 9/2004 | Chuah et al. | |
| 2005/0075124 A1 | 4/2005 | Willenegger et al. | |
| 2005/0076369 A1 | 4/2005 | Cai et al. | |
| 2005/0193309 A1 | 9/2005 | Grilli et al. | |
| 2006/0019641 A1 | 1/2006 | Vayanos et al. | |
| 2006/0156370 A1 | 7/2006 | Parantainen | |
| 2006/0168504 A1 | 7/2006 | Meyer et al. | |
| 2006/0189272 A1 | 8/2006 | Willenegger et al. | |
| 2006/0209870 A1 | 9/2006 | Lee et al. | |
| 2008/0318518 A1 | 12/2008 | Coutinho et al. | |
| 2009/0274446 A1 | 11/2009 | Ando et al. | |
| 2010/0172279 A1 | 7/2010 | Chen et al. | |

FOREIGN PATENT DOCUMENTS

| | | |
|---|---|---|
| EP | 1077539 | 2/2001 |
| EP | 1148687 | 10/2001 |
| IN | 00548/KOLNP/2004 | 3/2006 |
| IN | 00911/KOLNP/2004 | 5/2006 |
| IN | 00546/KOLNP/2006 | 8/2007 |
| JP | 05-219056 | 8/1993 |
| JP | 07-283782 | 10/1995 |
| JP | 09-270790 | 10/1997 |
| JP | 11-252009 | 9/1999 |
| JP | 2000-138676 | 5/2000 |
| JP | 2000-358267 | 12/2000 |
| JP | 2001-053675 | 2/2001 |
| JP | 2001-128205 | 5/2001 |
| JP | 2001-298407 | 10/2001 |
| JP | 2001-308856 | 11/2001 |
| JP | 2002-064878 | 2/2002 |
| JP | 2002-539490 | 11/2002 |
| JP | 2003-060699 | 2/2003 |
| JP | 2005-512273 | 4/2005 |
| KR | 1019988024467 | 7/1998 |
| KR | 1019990037501 | 5/1999 |
| KR | 100224852 | 7/1999 |
| KR | 19990053163 | 7/1999 |
| KR | 100249503 | 12/1999 |
| KR | 1020000032645 | 6/2000 |
| KR | 1020000037821 | 7/2000 |
| KR | 1020000047263 | 7/2000 |
| KR | 1020010026301 | 4/2001 |
| KR | 1020020009282 | 2/2002 |
| KR | 1020020019314 | 3/2002 |
| KR | 1020020079453 | 10/2002 |
| KR | 1020030029310 | 4/2003 |
| KR | 1020030069365 | 8/2003 |
| KR | 1020040064869 | 7/2004 |
| KR | 1020050014984 | 2/2005 |
| WO | WO 99/44313 | 9/1999 |
| WO | WO 00/54521 | 9/2000 |
| WO | WO 01/05158 | 1/2001 |
| WO | WO 01/10146 | 2/2001 |
| WO | WO 02/33937 | 4/2002 |
| WO | WO 02/41531 | 5/2002 |
| WO | WO 03/098871 | 11/2003 |
| WO | WO 03/105353 | 12/2003 |
| WO | WO 2004/002021 | 12/2003 |
| WO | WO 2004/017540 | 2/2004 |
| WO | WO 2004/028041 | 4/2004 |
| WO | WO 2004/028042 | 4/2004 |
| WO | WO 2004/042964 | 5/2004 |
| WO | WO 2005/013914 | 2/2005 |
| WO | WO 2005/067194 | 7/2005 |

OTHER PUBLICATIONS

3$^{rd}$ Generation Partnership Project; Technical Specification Group Services and System Aspects; Multimedia Broadcast/Multicast Service; Architecture and Functional Description, 3GPP TR23.846, Jan. 2002, XP002223634.

Vodafone Limited, "Avoiding HSS overload caused by MBMS (TR 5.2.4)", S2-BM-010016, 3GPP TSG-S2 MBMS Drafting Meeting, Dec. 2001.

Bamboo MediaCasting, "Alternatives to QoS Negotiation for MBMS", 3GPP MBMS workshop, May 2002, XP050000489.

Siemens, "Use of the TMGI in GERAN", 3GPP TSG GERAN #16, Aug. 2003, XP050009127.

"Definitions and Characteristics of Multicast Channels," TSG-RAN Working Group 2 (Radio Layer 2 and Radio Layer 3), Stockholm Mar. 8-11, 1999, TSGR2#2(99)076, Agenda Item: 8.1.2, 11 pages.

"Multicasting in UMTS," S.K. Palat, et al, Lucent Technol., UK, 3G Mobile Communication Technologies, 2002, Third International Conference on (Conf. Publ No. 489), May 8-10, 2002, pp. 96-101.

Digital Cellular Telecommunications System (Phase 2+); Technical Realization of Short Message Service cell Broadcast (SMSCB) (3GPP TS 03.41 version 7.4.0 Release 1998); ETSI TS 100 902 v7.4.0, Sep. 2000, 34 pages.

3$^{rd}$ Generation Partnership Project; Technical Specification Group Services and System Aspects; Multimedia Broadcast/Multicast Service; Stage 1 (Release 5); 3GPP TS22.146, V5.2.0, Mar. 2002, 14 pages.

3$^{rd}$ Generation Partnership Project ; Technical Specification Group Services and System Aspects; Multimedia Broadcast/Multicast Service (MBMS); Architecture and Functional Description (Release 6), 3GPP TS 23.246 V6.1.0, Dec. 2003.

"Some Considerations on the L2 Design of the RB Carrying MBMS (update)," Phillips, 10.2.1, TSG-RAN Working Group 2 (Radio Layer 2 and Radio Layer 3), TSGR2#37(03)2146, Budapost, Hungary, Aug. 25-29, 2003.

Siemens: "Discussion of requirements of a MBMS transport channel", TSG-RAN WG2 meeting #28, Kobe, Japan, Apr. 8-12, 2002. R2-020732.

* cited by examiner

SELECTIVE SERVICE METHOD IN MULTICAST SYSTEM

CROSS-REFERENCE TO RELATED APPLICATIONS

This application is a continuation of U.S. patent application Ser. No. 11/927,015, filed Oct. 29, 2007, which is a continuation of U.S. patent application Ser. No. 10/439,318, filed May 16, 2003 (now U.S. Pat. No. 7,308,278), and claims priority under 35 U.S.C. §119 to Korean Patent Application No. 27639/2002, filed on May 18, 2002 in the Republic of Korea, each of which is incorporated by reference herein in their entireties.

BACKGROUND OF THE INVENTION

1. Field of the Invention

The present invention relates to a multicast service of a 3GPP Universal Mobile Telecommunications System (UMTS) and, more particularly, to a selective service method in a multicast system.

2. Description of the Background Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work toward standardizing the UMTS performed by the 3GPP has resulted in the formation of five technical specification groups (TSG), each of which is directed to forming network elements having independent operations.

More specifically, each TSG develops, approves and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

FIG. 1 illustrates an example of the construction of a general UMTS network.

The UMTS is roughly divided into a terminal, a UTRAN and a core network.

The UTRAN includes one or more radio network subsystems (RNS). Each RNS includes an RNC and one or more Node Bs managed by the RNCs.

Node Bs are managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for terminal.

The RNCs perform functions which include assigning and managing radio resources, and operate as an access point with respect to the core network.

The UTRAN constructs and maintains a radio access bearer (RAB) for communication between the terminal and the core network. The core network requests end-to-end quality of service (QoS) requirements from the RAB, and the RAM supports the QoS requirements the core network has set. Accordingly, by constructing and maintaining the RAB, the UTRAN can satisfy the end-to-end QoS requirements.

The services provided to the specific terminal is roughly divided into a circuit switched service and a packet switched service. For example, a general voice phone call service belongs to the circuit switched service, while a Web browsing service through an Internet connection is classified as the packet switched service.

In case of supporting the circuit switched service, the RNC is connected to the MSC of the core network, and the MSC is connected to a GMSC (Gateway Mobile Switching Center) managing a connection to other networks.

Meanwhile, in case of the packet switched service, services are provided by a SGSN (Serving GPRS Support Node) and a GGSN (Gateway GPRS Support Node) 37 of the core network.

The SGSN supports a packet communication going toward the RNC, and the GGSN 37 manages connection to other packet switched networks (i.e, the Internet network).

As the 3GPP system has decided to provide a multimedia broadcast multicast service (MBMS), a fresh service of Release 6, 3GPP TSG SA (Service and System Aspect defines network elements required for the MBMS service and functions of each network element.

A cell broadcast service the conventional Release 99 has provided is limited to a service that a text type short message is broadcast to a certain area. Comparatively, the MBMS service provided by the Release 6 is an advanced service that not only broadcasts a multimedia but also multicasts the multimedia to terminals (UEs) which have subscribed for the corresponding service.

The MBMS will now be described in detail.

The MBMS, a downward-dedicated service, provides a streaming or background service to plural terminals by using a common or dedicated downward channel. The MBMS is divided into a broadcast mode and a multicast mode. The MBMS broadcast mode is a service transmitting multimedia data to every user located in a broadcast area, whereas the MBMS multicast mode is a service transmitting multimedia data to a specific user group located in a multicast area. The broadcast area signifies a broadcast service available area, and the multicast area signifies a multicast service available area.

Users who desire to receive the MBMS service should receive a service announcement and a service notification provided by a network. The service announcement means informing the terminal of a list of services to be provided and its related information, and the service notification means informing the terminal of information on broadcast data to be transmitted.

Especially, if the user intends to receive the multicast mode MBMS service, he/she should be admitted to a multicast subscription group. The multicast subscription group means a group of users who has finished an admission procedure. Once the user is admitted to the multicast subscription group, he/she can join a multicast group to receive a specific multicast service. In this case, the multicast group signifies a user group receiving the specific multicast service, and 'joining' means joining the multicast group gathered to receive the specific multicast service.

The joining behavior is in other way called a MBMS multicast activation. Accordingly, the user can receive the specific multicast data through the MBMS multicast activation or the joining behavior.

FIG. 2 shows a schematic network structure for providing the MBMS service.

As shown in FIG. 2, a broadcast multicast-service center (BM-SC) serves to schedule MBMS contents inputted from a contents provider. A cell broadcast center (CBC) is an entity (a physical or virtual unit handling a specific service) for providing an existing CBC service, that is, for broadcasting a text type short message to a certain area, and can be used for a service announcement of the MBMS service.

Meanwhile, in the case of the packet switched service, the MBMS service is provided by an SGSN (Serving GPRS Support Node) and a GGSN (Gateway GPRS Support Node) of the core network. The SGSN supports a packet communication toward a serving RNC (SRNC) of the UTRAN, and the GGSN manages connection to other packet switched networks such as the Internet through a border gateway (BG).

In the UMTS system, a GTP (GPRS Tunneling Protocol) layer is used to support transmission of the packet data. Specifically, the GTP layer is especially used for transmitting data of a service area. Thus, the GGSN manages a data transmission tunnel through the GTP layer in the existing UMTS packet domain, and generates and manages an MBMS context for the MBMS service.

FIG. 3 illustrates a transmission procedure of an MBMS data.

As shown in FIG. 3, data to be transmitted to members of the multicast group is delivered from an MBMS data source to the GGSN through an IP multicast, and the GGSN generates a GTP tunnel and transmits an MBMS data to the SGSNs which manage users subscribed for the corresponding multicast service through the GTP tunnel. Each SGSN routes the MBMS data to each RNC managing corresponding users, and the RNC transmits the received MBMS data to a corresponding user cell (the area managed by one Node B).

Accordingly, the specific MBMS service user located in the cell, that is, the specific terminals located in the corresponding multicast area, can be provided with the MBMS service upon receiving the MBMS data.

If the BM-SC includes the function of the GGSN, the MBMS data can be directly delivered to the SGSN without passing through the GGSN, and the data would be transmitted to the other entities in the same manner.

As mentioned above, the MBMS service includes the broadcast mode service and the multicast mode service. Unlike the broadcast mode service which broadcasts to all the area, the multicast mode service transmits data only to the users (terminals) admitted to the multicast group, of which the data is provided in a unidirectional point-to-multipoint transport method.

With respect to providing the multicast service, demands that different information by areas should be provided for one service or demands that one service with different QoSs (Quality of Service) by areas should be provided are increasing. In addition, there should exist a variety of menus or channels for one service provided in the same area.

However, currently, the 3GPP defines only the requirements for the MBMS service, failing to provide a substantial method as to how to perform the requirements.

The above references are incorporated by reference herein where appropriate for appropriate teachings of additional or alternative details, features and/or technical background.

SUMMARY OF THE INVENTION

Therefore, an object of the present invention is to provide a selective service method of a multicast system that is capable of transmitting different MBMS service data by multicast groups.

Another object of the present invention is to provide a selective service method of a multicast system that is capable of transmitting the same MBMS service data but with different QoSs by multicast groups.

Still another object of the present invention is to provide a selective service method of a multicast system that is capable of providing diverse menus or channels for one multicast service.

To achieve at least the above objects in whole or in parts, there is provided a selective service method of a multicast system in a system providing a multimedia broadcast/multicast service (MBMS), including: attaching an identifier (ID) for a multicast service to an MBMS data; and multicasting the identifier-attached MBMS data stream.

Preferably, the identifier includes: an MBMS service ID and an ID indicative of a kind of a lower service of the MBMS service. In such a case, the MBMS service ID consists of an access point number (APN) and an IP multicast address.

Preferably, the ID indicative of a kind of a lower service is a multicast group ID.

Preferably, the ID indicative of a kind of a lower service includes a multicast group ID and a multicast area ID.

Preferably, the ID indicative of a kind of a lower service includes a multicast group ID, a multicast area ID and an UDP/TCP port number.

To achieve at least these advantages in whole or in parts, there is further provided a selective service method of a multicast system in a system providing a multimedia broadcast/multicast service (MBMS), including: attaching a first identifier (ID) for an MBMS data multicast service; attaching a second identifier indicative of a kind of a lower service of an MBMS data; and multicasting the MBMS data stream with the first and second identifier attached thereto.

Preferably, the first identifier is an MBMS service ID.

Preferably, the MBMS service ID consists of an access point number (APN) and an IP multicast address.

Preferably, the second identifier is a multicast group ID.

Preferably, the second identifier includes a multicast group ID and a multicast area ID.

Preferably, the second identifier includes: a multicast group ID; a multicast area ID; and an UDP/TCP port number.

To achieve at least these advantages in whole or in parts, there is further provided a selective service method of a multicast system in a system providing a multimedia broadcast/multicast service (MBMS), including: classifying an entire multicast service area into certain units; attaching an identifier of the classified area to a multicast data stream; and multicasting the identifier-attached multicast data stream.

Preferably, the entire multicast area is classified by multicast groups, by multicast areas and by multicast services. In such a case, the identifier is performed by a member managing entity of a core network which can be one of a Broadcast Multicast-Service Center (BM-SC), a Serving GPRS Support Node (SGSN) and a Gate GPRS (GGSN).

Preferably, the identifier is an MBMS service IDA and a multicast group ID.

Preferably, the MBMS service ID consists of an access point number (APN) and an IP multicast address.

Preferably, the identifier includes: an MBMS service ID; a multicast group ID; and a multicast area ID.

The selective service method of a multicast system further includes: attaching another identifier indicative of a kind of a lower service to the multicast data stream.

Preferably, the identifier indicative of a kind of a lower service is an UDP/TCP port number.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile communication system such as the UMTS (universal mobile telecommunications system) developed by 3GPP. Nonetheless, the present invention can be also adopted for a communication system operating in conformity to a different standard. Preferred embodiments of the present invention will now be described in detail.

The present invention proposes a method for discriminating a multicast service so that different information can be provided by areas for one service or a service can be provided with different QoS by areas.

In addition, the present invention proposes a method for discriminating a multicast service so that diverse menus or channels may exist for one service. For this purpose, in the present invention, a data identifier can be attached to one multicast data stream. The data identifier may include a multicast service identifier and an identifier indicative of a kind of a corresponding multicast service. The identifier indicative of a kind of the service may include a multicast group ID, a multicast area ID and an UDP/TCP port number, etc.

Figure 1:
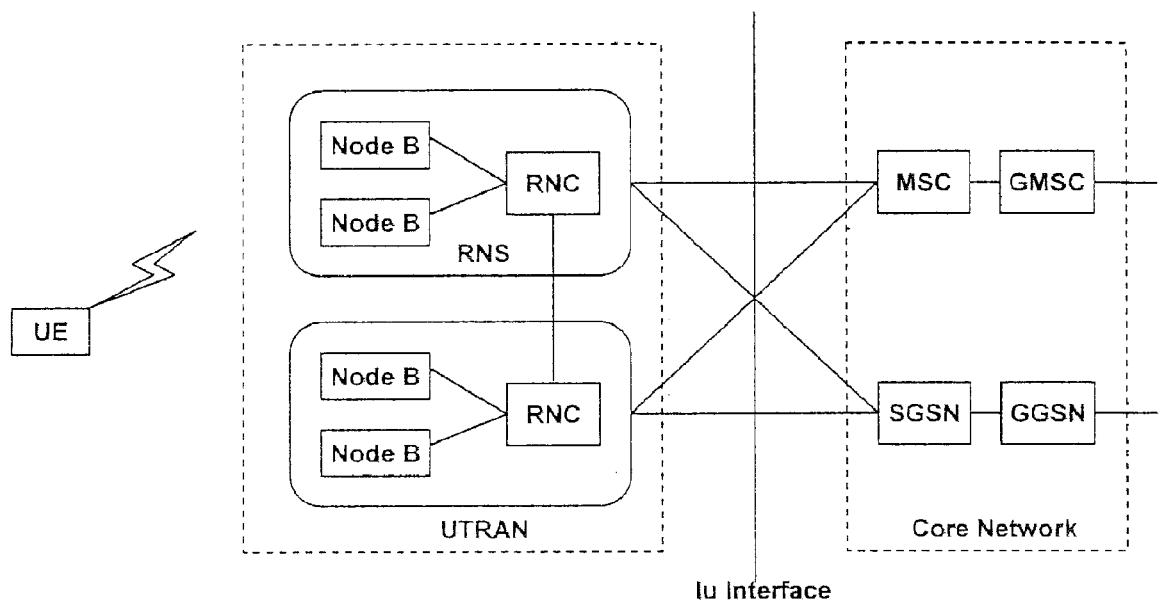
FIG. 1 illustrates a network structure of a general UMTS system.
Figure 2:
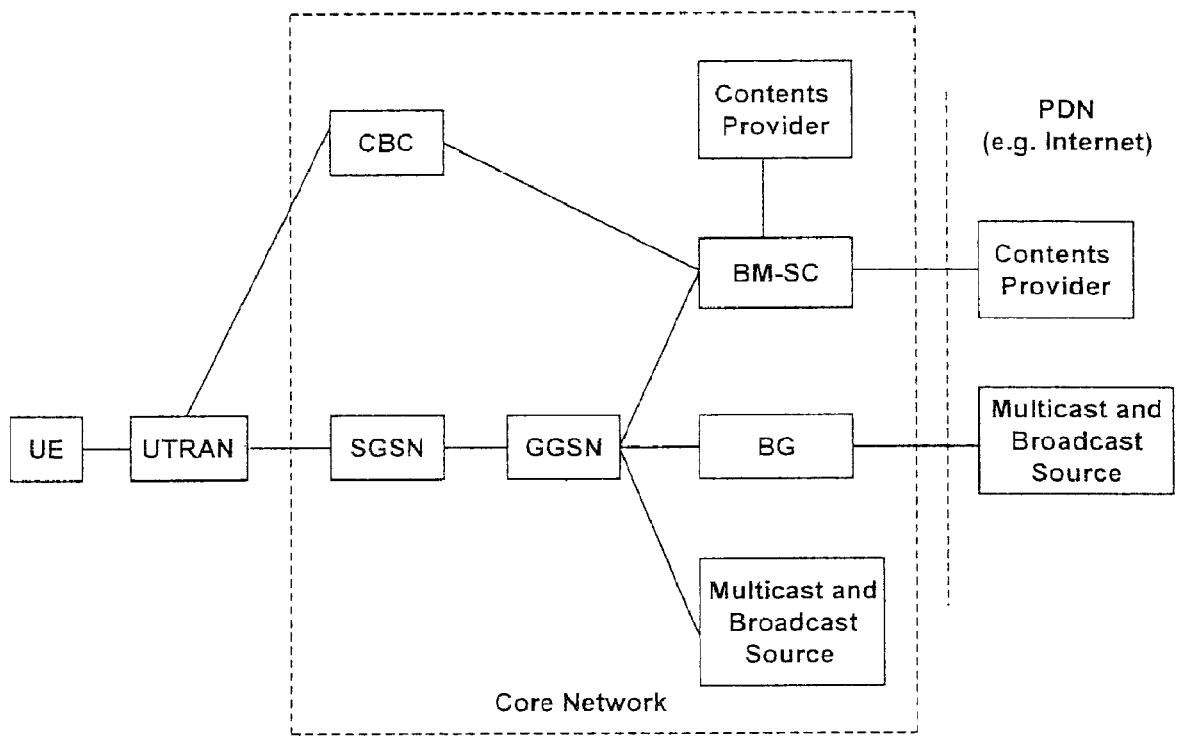
FIG. 2 illustrates a schematic network structure for providing an MBMS service in an UMTS system.
Figure 3:
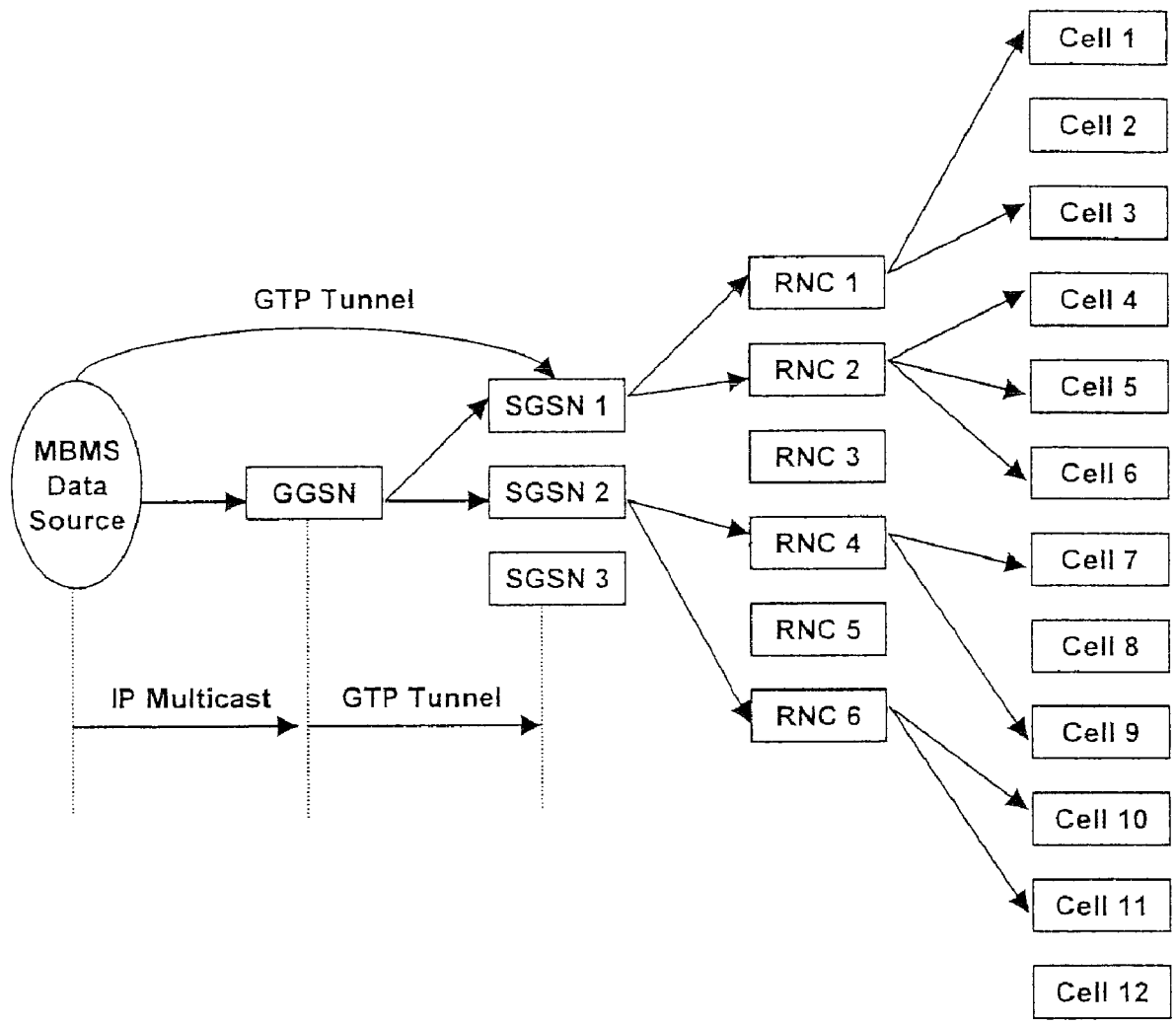
FIG. 3 illustrates a transmission path of an MBMS service data in the UMTS system.
Figure 4:
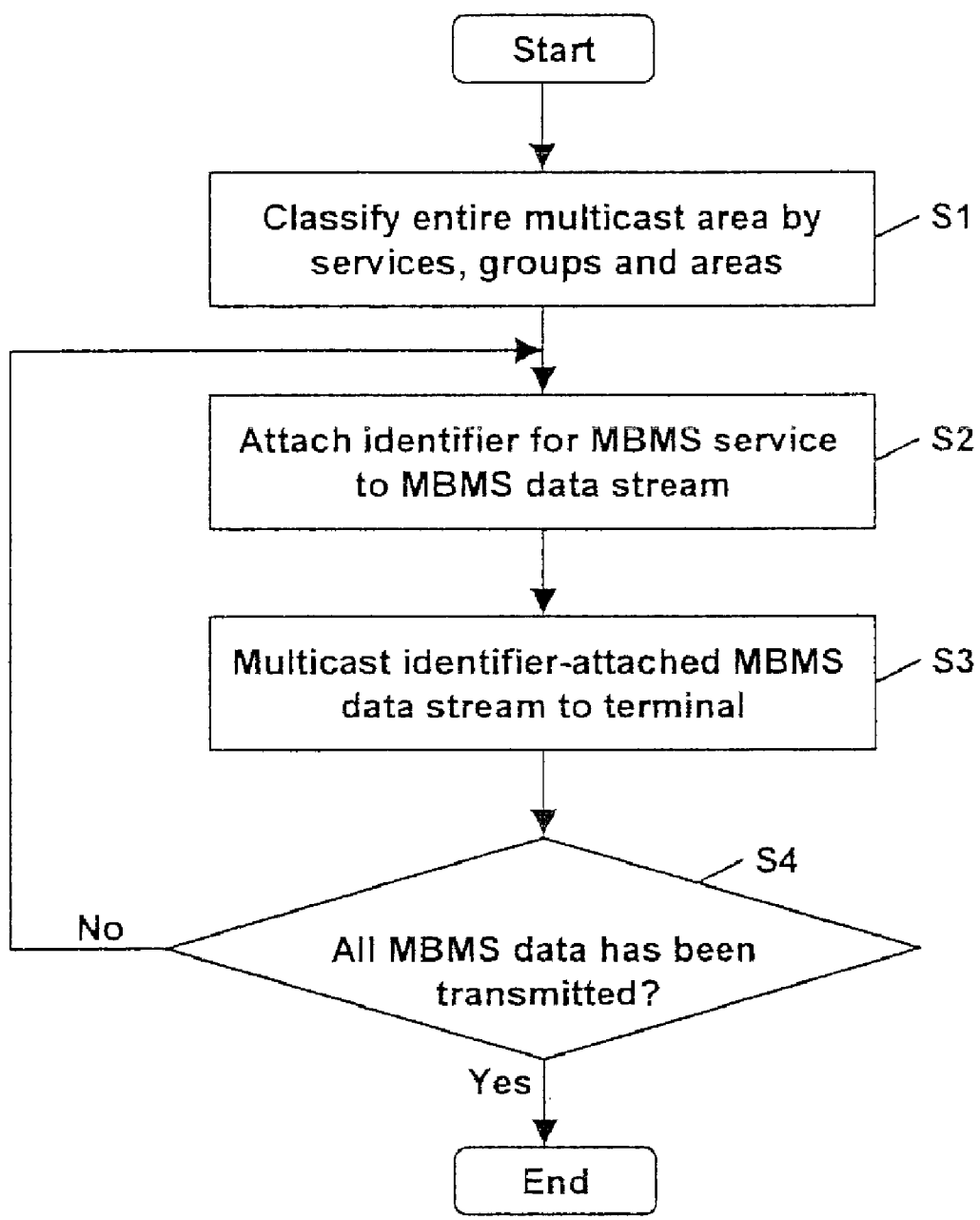
FIG. 4 is a flow chart of a selective service method of a multicast system in accordance with the present invention.

The selective service method in a multicast system in accordance with a preferred embodiment of the present invention will now be described in detail with reference to FIG. 4.

In general, when a multicast service is provided, there may be several types of services related to one multicast group or there may be several multicast groups for one multicast service.

In the present invention, the entire multicast area is classified by services, groups and RNCs. This classification can be defined by a member managing entity (i.e., SGSN, BM-SC and GGSN, etc.) of the core network or in the UTRAN in the future. For example, the member managing entity of the core network can define a multicast service and a concept of a multicast area providing the multicast service by using a logical structure as shown in FIG. 4.

Figure 5:
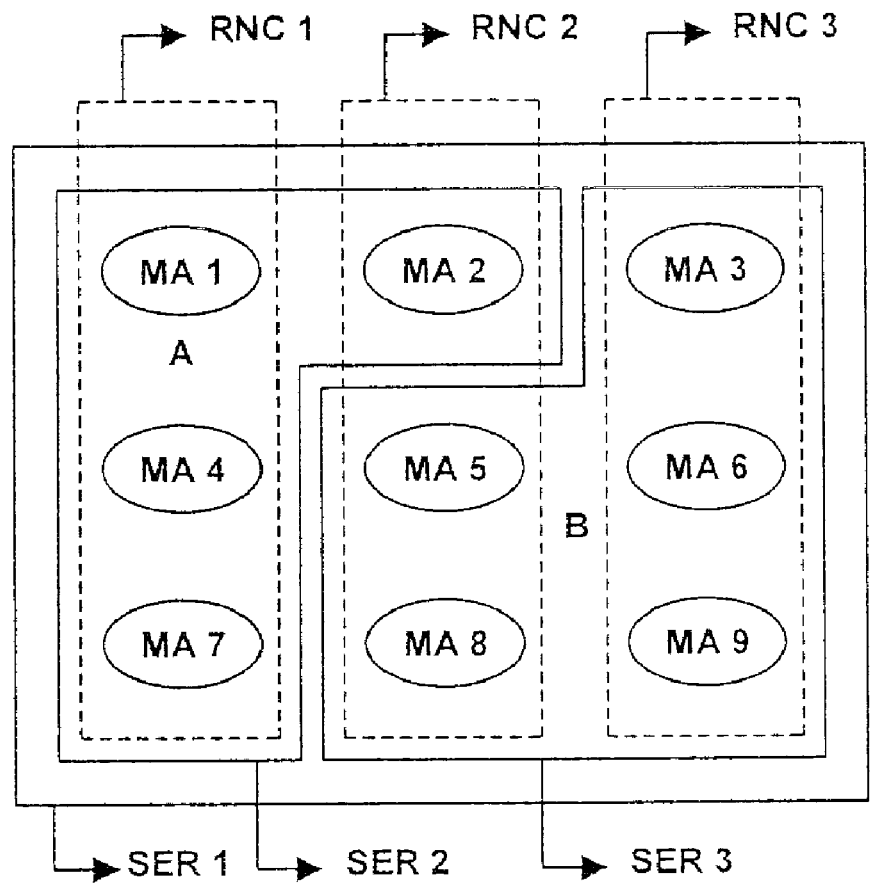
FIG. 5 illustrates a logical structure classifying an entire multicast service area.

FIG. 5 shows an example of three types of multicast services, that is, first to third services SER1.about.SER3.

The service should be differently provided in accordance with each area. As shown in FIG. 5, the first service SER1 is provided in all multicast areas MA1-MA9. However, the second service SER2 is provided in only multicast areas MA1, MA2, MA4 and MA7 and the third service SER3 can be provided in only multicast areas MA3, MA5, MA6, MA8 and MA9.

Also, a multicast group may exist for each of the services SER1.about.SER3. Namely, the first service SER1 is provided to both the multicast groups A and B, the second service SER2 is provided only to the multicast group A, while the third service SER3 is provided to the multicast group B. The multicast group A includes multicast areas of MA1, MA2, MA4 and MA7, while the multicast group B includes multicast groups of MA3, MA5, MA6 AND MA9.

With such a logical structure, in spite of the same multicast service, a QoS and a transmission content (MBMS data) may differ according to the multicast group and the multicast area. Preferably, the multicast areas MA1.about.MA9 are mapped geographically. For instance, in consideration of the geographical area, the first RNC manages an area corresponding to the multicast areas MA1, MA4 and MA7, the second RNC manages an area corresponding to the multicast areas MA2, MA5 and MA8, and the third RNC manages an area corresponding to the multicast areas MA3, MA6 and MA9.

Accordingly, a terminal belonging to the multicast areas MA1, MA2, MA4 and MA7 can be provided with the first service SER1 or second service SER2 by joining the multicast group A, while a terminal belonging to the multicast areas MA3, MA5, MA6A and MA9 can be provided with the second service SER2 or third service SER3 by joining the multicast group B.

When the classification to the entire multicast area is completed, the member managing entity of the core network attaches an identifier for an MBMS service and an identifier indicative of a kind of a lower service of the MBMS service to the MBMS service data stream to be transmitted (step S2). The identifier indicative of a kind of a lower service of the MBMS service signifies an identifier indicative of a multicast group, a multicast area and an UDP/TCP port number. Nonetheless, in the present invention, without being limited thereto, various identifiers for providing the MBMS service can be attached to the MBMS service stream as necessary.

Figure 6:
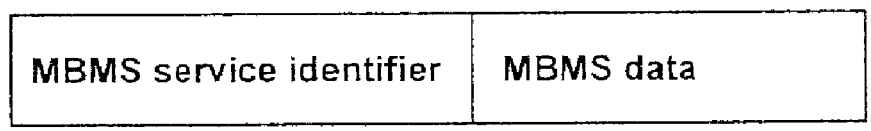
FIG. 6 illustrates an example of an MBMS service stream identifier in accordance with the present invention.

Accordingly, in order to transmit and receiving the MBMS service discriminately, as shown in FIG. 6, MBMS stream identifier is defined as follows.

First, an MBMS stream identifier is defined to transmit different MBMS data by multicast groups for one service.

Usually, a service such as weather information should be provided with different information by areas. In the present invention, in the case of the weather information service, the current weather information can be multicast appropriately to each area depending on areas. For example, as shown in FIG. 5, the first service SER1 is provided to both multicast groups A and B, and in this respect, if the service subject is weather information, different weather information can be transmitted to each of the multicast groups A and B. Accordingly, in order to transmit weather information by discriminating the MBMS service, in the present invention, the MBMS service stream identifier can be defined by the below formula (1):

MBMS service identifier=MBMS service ID+multicast group ID   (1)

The MBMS service identifier defined in formula (1) is used to provide different MBMS service data by multicast groups for one multicast service or to provide the same data but with different QoSs by multicast groups for one service. The MBMS service identifier can be defined in the member managing entity (i.e., SGSN, BM-SC, GGSN, etc.) of the core network or can be defined in the UTRAN in the future.

Figure 7:
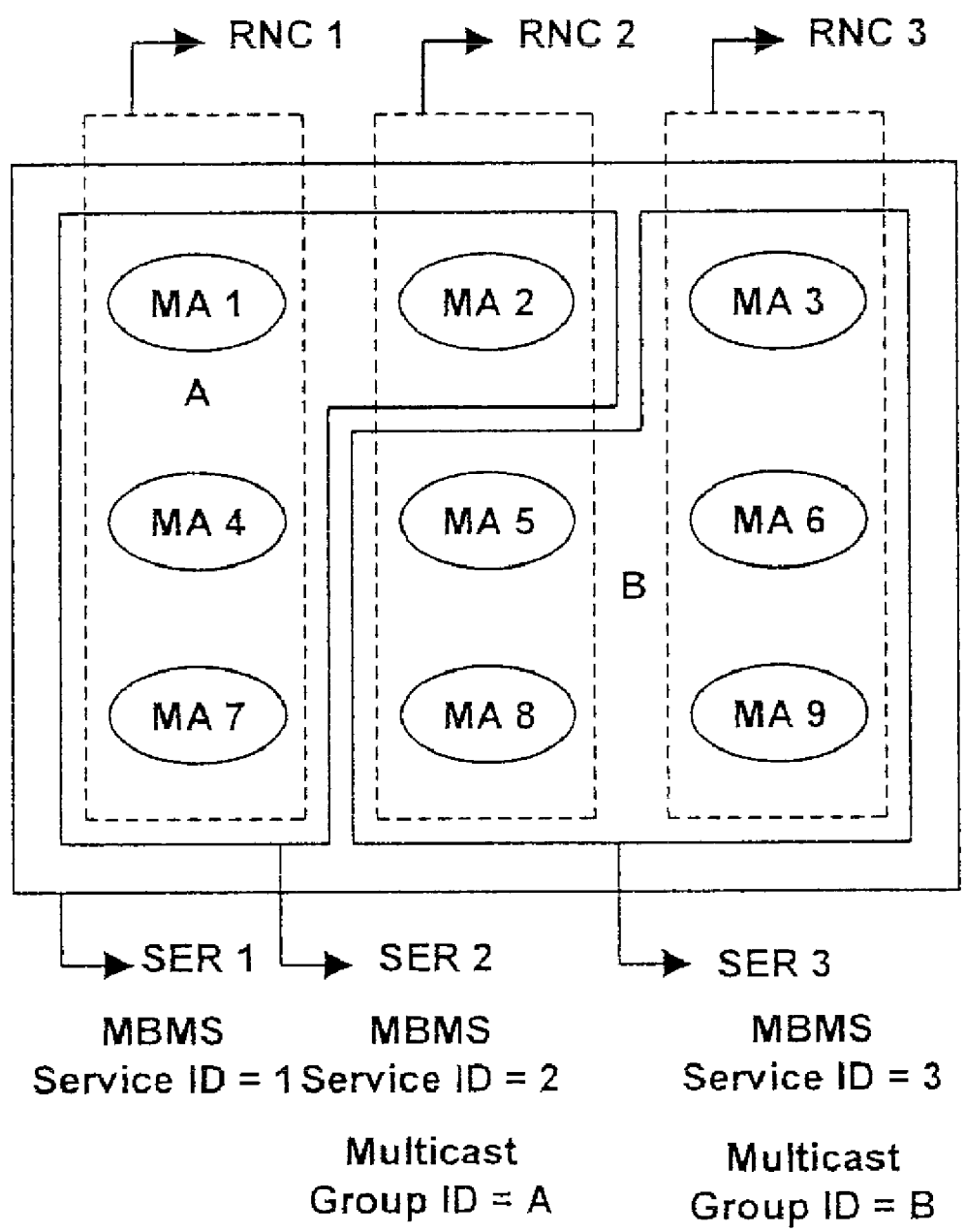
FIG. 7 shows an example of setting the MBMS service stream identifier in a logical structure providing the multicast service of FIG. 5 in accordance with the present invention.

FIG. 7 shows an example of transmitting MBMS service data by multicast groups by using the MBMS service identifier defined in formula (1).

With reference to FIG. 7, if the MBMS service data for the first service SER1 is transmitted to the multicast areas MA1, MA2, MA4 and MA7 belonging to the multicast group A, a MBMS service ID is set to '1' and a multicast group ID is set to 'A'. If an MBMS service data is transmitted to the multicast areas MA3, MA5, MA6 and MA9 belonging to the multicast group B, an MBMS service ID is set to '1' and a multicast group ID is set to 'B'.

Second, in the present invention, in order to transmit different MBMS data by multicast areas for one service, an MBMS stream identifier is defined by the below formula (2):

$$\text{MBMS service identifier} = \text{MBMS service ID} + \text{multicast group ID} + \text{Multicast area ID} \quad (2)$$

The MBMS service identifier defined in formula (2) is used to transmit different MBMS service data by multicast areas for one multicast service or to provide the same data but different QoSs by multicast areas for one multicast service.

If the MBMS service data for the first service SER1 is transmitted to the multicast area MA1 belonging to the multicast group A by using the MBMS service identifier defined in formula (2), the MBMS service ID is set to 1, multicast group ID is set to 'A' and multicast area ID is set to 1. Meanwhile, If the MBMS service data is transmitted to the multicast area MA4 belonging to the multicast group A by using the MBMS service identifier defined in formula (2), an MBMS service ID is set to 1, a multicast group ID is set to 'A' and a multicast area ID is set to 4.

MBMS service identifiers can be set for the multicast areas MA2 and MA7 belonging to the multicast group A and the multicast areas MA3, MA5, MA6, MA8 and MA9 belonging to the multicast group B in the same manner.

Third, in the present invention, an MBMS stream identifier can be defined to provide diverse menus or channels for one multicast service provided in the same area.

Currently, a multicast service provided from the same service, for example, a paid TV service, provides various menus and channels. With such a multicast service, even if users have requested the same service in the same area, they may want different content of information. Thus, in order to meet their demand, it is necessary to provide a variety of channels so that they can select for their taste. Therefore, in the present invention, in order to provide diverse menus or channels for one multicast service provided in the same area, an MBMS service stream identifier is defined by the below formula (3):

$$\text{MBMS service identifier} = \text{MBMS service ID} + \text{multicast group ID} + \text{UDP/TCP port number} \quad (3)$$

In case where the MBMS service identifier defined in formula (3) is used, if a user terminal belonging to the multicast area MA1 uses a sub-menu 2 of the first service SER1, an MBMS service ID is set to '1', a multicast group ID is set to 'A', and UDP/TCP port number is set to 1000. Meanwhile, if a user terminal belonging to the multicast area MA2 uses a sub-menu 3 of the first service SER1, an MBMS service ID is set to '1', a multicast group ID is set to 'A' and an UDP/TCP port number is set to 2000.

If a user belonging to other multicast area uses a sub-menu of a specific service, the MBMS service stream identifier can be set in the same manner.

Accordingly, a form of the MBMS service stream identifier including all the three methods can be expressed in the below formula (4):

$$\text{MBMS service identifier} = \text{MBMS service ID} + \text{multicast group ID} + [\text{multicast area ID}] + [\text{UDP/TCP port number}] \quad (4)$$

The multicast area IDA and the UDP/TCP port number in the brackets are not requisite but can be used as necessary. That is, in the present invention, in order to discriminate the MBMS service stream, the MBMS service stream includes the MBMS service ID and the multicast group ID. The MBMS service ID may be represented by including, for example, an access point number (APN) and an IP multicast address.

Namely, the multicast area ID is additionally used in order to transmit different MBMS service stream by multicast areas for one service or in order to provide the same data but with different QoSs by multicast areas.

The UDP/TCP port number can be additionally used in order to provide diverse menus or channels for one multicast service provided in the same area.

Once the identifier for the MBMS service is attached to the MBMS data stream, the member managing entity of the core network multicasts a corresponding MBMS data stream to a terminal, and thereafter, when the MBMS data streams are completely transmitted, the process is terminated. If, however, there remain MBMS data streams to be transmitted, the operation after the step S2 is repeatedly performed.

Accordingly, the terminal belonging to a specific group or a specific area can selectively receive the MBMS data on the basis of the MBMS data stream multicast from the member managing entity of the core network.

As so far described, the selective service method of a multicast system in accordance with the present invention have the following advantages.

That is, the multicast service stream identifier is provided so that each multicast area can receive different information for one service or one multicast service can be provided with different QoSs to areas.

In addition, the multicast service stream identifier is provided by which a user can selectively receive diverse menus or channels for one multicast service provided in the same area. Thus, by providing the multicast service stream identifier, users' desires for various services can be satisfied.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing an MBMS service to a UE, the method comprising:
   providing, from a core network (CN) to a UTRAN, information about at least one MBMS service for the UE, said information to be used by the UTRAN for transmitting to the UE the MBMS service that includes MBMS data units having an MBMS ID attached thereto by the UTRAN, wherein the MBMS ID is used to distinguish between MBMS services, wherein the information provided to the UTRAN is related to at least one of a group ID, an IP address, service areas, and quality of service (QoS).

2. The method of claim 1, wherein the IP address includes an IP multicast ID of the MBMS service requested by the UE.

3. The method of claim 1, wherein the group ID is used for MBMS service identification.

4. The method of claim 3, wherein the group ID is provided via MBMS multicast service activation or MBMS service announcement.

5. The method of claim 1, wherein the MBMS ID is represented by an access point number.

6. The method of claim 1, wherein the core network creates a MBMS context for the MBMS service.

7. The method of claim 6, wherein the MBMS context is associated with the information related to at least one of a group ID, an IP address, service areas, and quality of service (QoS).

8. The method of claim 1, wherein the core network comprises a Serving GPRS Support Node (SGSN), a Gateway GPRS Support Node (GGSN) and a broadcast multicast-service center (BM-SC) that cooperate to perform the providing step for the MBMS service.

* * * * *